UNITED STATES PATENT OFFICE.

GUSTAV FRITSCHE, OF STRZEBOWITZ, NEAR SCHÖNBRUNN, AUSTRIA-HUNGARY, ASSIGNOR TO THE ROESSLER & HASSLACHER CHEMICAL COMPANY, OF NEW YORK, N. Y., A CORPORATION OF NEW YORK.

GERMICIDE AND INSECTICIDE.

1,042,422.          Specification of Letters Patent.     Patented Oct. 29, 1912.

No Drawing.          Application filed June 28, 1907. Serial No. 381,215.

*To all whom it may concern:*

Be it known that I, GUSTAV FRITSCHE, a subject of the Emperor of Austria and a resident of Strzebowitz, near Schönbrunn, Austria-Hungary, have invented a certain new and useful Germicide and Insecticide, of which the following is a specification.

I have found that certain mixtures of skimmed milk and formalin have great antiseptic as well as germicidal and insecticidal effects. I have further found that such mixture is mainly used for medicinal and prophylatic purposes. I have especially obtained very good results by using such mixtures in cases of inflammatory rheumatism. One of the theories of the cause of rheumatism is based on the existence of certain microbes which would be killed by the mixtures described. In using these mixtures to cure rheumatism they are applied externally in the form of wet compresses and the like.

When using these mixtures for the preservation of food, for instance, meat, I have found that two cubic centimeters of the same are sufficient for one liter of water in which the meat is cooked.

When using the mixtures as insecticides I have found that the application thereof in the form of a spray is effective.

In preparing these mixtures I proceed as follows: Ten liters of skimmed milk are heated to the boiling point and kept at same for forty-five minutes, then the milk is cooled and one liter of formalin is added under stirring. The mixture is then filtered and ready for use. Of course it is understood that I do not limit myself to these exact proportions.

What I claim is as follows:

1. An antiseptic comprising skimmed milk previously heated to the boiling point and cooled and formalin.

2. An antiseptic comprising ten parts of skimmed milk previously heated to the boiling point and cooled and one part of formalin.

3. An antiseptic comprising slightly condensed skimmed milk, previously heated to the boiling point and maintained at the boiling point for some time and then cooled, and formalin.

4. An antiseptic comprising ten parts of slightly condensed skimmed milk, previously heated to the boiling point and maintained at the boiling point for some time and then cooled, and one part of formalin.

In witness whereof I have hereunto signed my name in the presence of two subscribing witnesses.

GUSTAV FRITSCHE.

Witnesses:
 GERHARD FRITSCHE,
 HUGO KOLLARRIK.

---

Copies of this patent may be obtained for five cents each, by addressing the "Commissioner of Patents, Washington, D. C."